United States Patent [19]

Okada et al.

[11] Patent Number: 5,318,997
[45] Date of Patent: Jun. 7, 1994

[54] METHOD FOR PRODUCTION OF OPEN CELL RIGID POLYURETHANE FOAM

[75] Inventors: Kazuo Okada, Toyonaka; Yoshihiko Tairaka, Saki, both of Japan

[73] Assignee: Takeda Chemical Industries, Ltd., Osaka, Japan

[21] Appl. No.: 48,513

[22] Filed: Apr. 20, 1993

[30] Foreign Application Priority Data

Apr. 20, 1992 [JP] Japan .................................. 4-099374

[51] Int. Cl.$^5$ ............................................. C08G 18/00
[52] U.S. Cl. ..................................... 521/174; 521/78; 521/155
[58] Field of Search .......................... 521/174, 78, 155

[56] References Cited

U.S. PATENT DOCUMENTS

| | | | |
|---|---|---|---|
| 4,409,341 | 10/1983 | Hira et al. ............................ | 521/162 |
| 4,923,904 | 5/1990 | Hasegawa et al. .................. | 521/174 |
| 5,013,766 | 5/1991 | Hanusa ................................ | 521/137 |
| 5,063,253 | 11/1991 | Gansen ................................ | 521/174 |

FOREIGN PATENT DOCUMENTS 63-86713 4/1988 Japan .
68720 1/1974 Luxembourg .

Primary Examiner—Morton Foelak
Attorney, Agent, or Firm—Wenderoth, Lind & Ponack

[57] ABSTRACT

A method of producing an open cell rigid polyurethane foam which comprises reacting a mixture of polyols having a hydroxyl value of 160-360 mg KOH/g with a polyisocyanate in the presence of water as a blowing agent in an amount of 6-12 parts by weight in relation to 100 parts by weight of the mixture of polyols at an isocyanate index of 70-120, the mixture of polyols comprising:

(a) 30-60% by weight of a first polyoxyalkylene polyol having a functionality of 2-3.5, a hydroxyl value of 28-90 mg KOH/g, a polyoxyethylene unit content of not more than 5% by weight, and a primary hydroxyl group content of not more than 15% based on the total of the hydroxyl groups of the first polyoxyalkylene polyol;

(b) 30-60% by weight of a second polyoxyalkylene polyol having a functionality of 3-6, a hydroxyl value of 150-500 mg KOH/g, and a primary hydroxyl group content of not more than 5% based on the total of the hydroxyl groups of the second polyoxyalkylene polyol; and (c) 0-25% by weight of a third polyol having a functionality of 2-3, a hydroxyl value of 450-840 mg KOH/g, and a primary hydroxyl group content of not more than 5% based on the total of the hydroxyl groups of the third polyol.

18 Claims, No Drawings

METHOD FOR PRODUCTION OF OPEN CELL RIGID POLYURETHANE FOAM

FIELD OF THE INVENTION

This invention relates to a method for the production of an open cell rigid polyurethane foam, and more particularly, to a method for the production of an open cell rigid polyurethane foam by use of water as a substantial blowing agent stably irrespectively of the foaming method employed.

BACKGROUND OF THE INVENTION

Usually a rigid polyurethane foam has closed cells, and a gas such as a halogenated lower aliphatic hydrocarbon, e.g., fluorotrichloromethane, or carbon dioxide used as a blowing agent is enclosed in the cells. Since such a gas has a low thermal conductivity, the rigid polyurethane foam is suitably used as a heat insulating material in, for example, refrigerators, buildings, low temperature warehouses, storage tanks, refrigerator ships, or pipings. However, such a conventional rigid polyurethane foam as above mentioned is limited in use since the foam readily changes in dimensions, or is deformed remarkably under the circumstances where tempratures change sharply.

In contrast, an open cell rigid polyurethane foam is not so good as the closed cell rigid polyurethane foam in heat insulating properties, however, it has an advantage that it can be safely used without any substantial dimensional change under the circumstances where temperatures change sharply.

There have hitherto been proposed a number of methods for the production of open cell rigid polyurethane foam, among which is, for example, a method wherein a variety of polyols having a variety of functionality are used in combination, as described in Japanese Patent Publication No. 54-5840 or No. 4-487.

However, the method employs a halogenated hydrocarbon together with a small amount of water as a blowing agent, so that the resultant foam has in part cell walls of a reduced mechanical strength and the walls are partly broken by the gas heated when the foam is formed, thereby to provide an open cell rigid polyurethane foam. Accordingly, the method allows the halogenated hydrocarbon or blowing agent to be released into the air when the foam is produced, with a result that such a gas might cause environmental contamination. In addition, such release of gas is disadvantageous from the economical standpoint. As a further problem, the halogenated hydrocarbon used as a main blowing agent in the prior art is poorly miscible with water, and thus the mixture of the halogenated hydrocarbon and water tends to separate, so that the use of such a mixture as a blowing agent fails to provide an open cell foam having a fixed quality in a stable manner.

As set forth above, there has been developed no method which produces an excellent open cell rigid polyurethane foam in a stable manner by use of a blowing agent substantially comprising water, since water tends to react with an isocyanate compound to form urea bonds thereby to form crosslinking structures in the resultant polyurethane foam, as well as to produce carbon dioxide.

Moreover, in general, when water is used as the main blowing agent, an open cell rigid polyurethane foam may be produced by a free foaming process, however, a closed cell rigid foam may be readily produced on account of an imbalance of foaming reaction and crosslinking reaction either by a foam casting method wherein a mold is used or a spray foaming process wherein the material used has a high reactivity. It is also difficult to prepare a uniform premix since the components used therein are poor in miscibility with each other when water is used as a main blowing agent.

BRIEF SUMMARY OF THE INVENTION

It is an object of the invention to provide a method of producing an open cell rigid polyurethane foam by use of a blowing agent substantially comprising water in a stable manner irrespectively of the foaming method employed.

The invention provides a method of producing an open cell rigid polyurethane foam which comprises reacting a mixture of polyols having a hydroxyl value of 160–360 mg KOH/g with a polyisocyanate in the presence of water in an amount of 6–12 parts by weight in relation to 100 parts by weight of the mixture of polyols at an isocyanate index of 70–120, the mixture of polyols comprising:

(a) 30–60% by weight of a first polyoxyalkylene polyol having a functionality of 2–3.5, a hydroxyl value of 28–90 mg KOH/g, a polyoxyethylene unit content of not more than 5% by weight, and a primary hydroxyl group content of not more than 15% based on the total of the hydroxyl groups of the first polyoxyalkylene polyol;

(b) 30–60% by weight of a second polyoxyalkylene polyol having a functionality of 3–6, a hydroxyl value of 150–500 mg KOH/g, and a primary hydroxyl group content of not more than 5% based on the total of the hydroxyl groups of the second polyoxyalkylene polyol; and (c) 0–25% by weight of a third polyol having a functionality of 2–3, a hydroxyl value of 450–840 mg KOH/g, and a primary hydroxyl group content of not more than 5% based on the total of the hydroxyl groups of the third polyol.

DETAILED DESCRIPTION OF THE INVENTION

The first polyol (a) used in the invention has a functionality of 2–3.5, a hydroxyl value of 28–90 mg KOH/g, a polyoxyethylene unit (or ethylene oxide unit) content of not more than 5% by weight, and a primary hydroxyl group content of not more than 15% based on the total of the hydroxyl groups of the first polyol.

The first polyol (a) may be produced by addition-polymerizing an alkylene oxide such as propylene oxide with a polyhydric alcohol having a functionality of 2–3.5 as an initiator so as to provide a polyol having a hydroxyl value in the range of 28–90 mg KOH/g. It is also necessary that the first polyol (a) has a polyoxyethylene unit content of not more than 5% by weight, and a primary hydroxyl group content of not more than 15% based on the total of the hydroxyl groups which the first polyol has in the molecule. The polyhydric alcohol having a functionality of 2–3.5 may be obtained as a mixture of two or more of such polyhydric alcohols as propylene glycol, dipropylene glycol, glycerine, trimethylolpropane, pentaerythritol, diglycerine, methylglucoside, sorbitol or glucose. If the functionality is appropriate, such a polyhydric alcohol as above mentioned may be used singly.

The use of such a first polyol (a) having hydroxyl value of more than 90 mg KOH/g, or a polyoxyethylene unit content of more than 5% by weight, or a primary hydroxyl group content of more than 15% based on the total of the hydroxyl groups of the first polyol, does not provide an excellent open cell rigid polyurethane foam. The production of a polyol having a hydroxyl value of less than 28 mg KOH/g may be practically difficult.

The mixture of polyols used in the invention contains the first polyol (a) in an amount of 30-60%, preferably 35-55% by weight. When the mixture of polyols contains the first polyol (a) in an amount of less than 30% by weight, the resultant rigid foam has no excellent open cells. The foam has a rather large closed cell content. However, when the mixture of polyols contains the first polyol (a) in an amount of more than 60% by weight, the resultant cells may be uneven, or an excellent rigid foam may not be obtained. A polyoxypropylene polyol is particularly preferred as the first polyol (a) in the invention.

The second polyol (b) used in the invention has a functionality of 3-6 a hydroxyl value of 150-500 mg KOH/g, and a primary hydroxyl group content of not more than 5% based on the total of the hydroxyl groups which the second polyol has.

The second polyol (b) may be produced by addition-polymerizing an alkylene oxide such as propylene oxide with a polyhydric alcohol having a functionality of 3-6 as an initiator so as to provide a polyol having a hydroxyl value in the range of 150-500 mg KOH/g. It is also necessary that the second polyol (b) has a primary hydroxyl group content of not more than 15% based on the total of the hydroxyl groups which the second polyol has in the molecule.

The polyhydric alcohol having a functionality of 3-6 used as an initiator may be obtained as a mixture of two or more of such polyhydric alcohols as propylene glycol, dipropylene glycol, glycerine, trimethylolpropane, pentaerythritol, diglycerine, methylglucoside, sorbitol or glucose. In addition to the above, there may be also used as an initiator, an aliphatic amine (or an alkanolamine) such as monoethanolamine, diethanolamine or triethanolamine, an ethylene(poly)amine such as ethylenediamine, or an aromatic amine such as 2,4/2,6-tolylenediamine, 2,3/3,4-tolylenediamine, diaminodiphenylmethane or polymethylene polyphenylisocyanate. If the functionality is appropriate, the above mentioned initiator may be used singly. A mixture of polyhydric alcohol and an amine compound as mentioned above may also be used as an initiator.

The use of such a second polyol (b) having a hydroxyl value of more than 500 mg KOH/g fails to form excellent open cells, whereas the use of such a second polyol (b) having a hydroxyl value of less than 150 mg KOH/g may form an open cell rigid foam having an insufficient mechanical strength. The use of such a second polyol (b) having a primary hydroxyl group content of more than 5% based on the total of the hydroxyl groups of the second polyol does not form excellent open cells.

The mixture of polyols used in the invention contains the second polyol (b) in an amount of 30-60%, preferably 40-55% by weight. When the mixture of polyols contains the second polyol (b) in an amount of less than 30% by weight, the resultant foam may be poor in strength, whereas when the mixture of polyols contains the second polyol (b) in an amount of more than 60% by weight, there may not be formed excellent open cells.

In order to raise the reactivity of the material used, for instance, as spray foaming is carried out, the second polyol (b) is preferably that obtained by the addition polymerization of propylene oxide (and optionally ethylene oxide together) by use of such an amine compound as an aliphatic amine (or an alkanolamine), an ethylene(poly)amine or an aromatic amine as hereinbefore mentioned as an initiator. A polyoxypropylene polyol is particularly preferred as the second polyol (b) in the invention.

The third polyol (c) used in the invention has a functionality of 2-3, a hydroxyl value of 450-840 mg KOH/g, and a primary hydroxyl group content of not more than 5% based on the total of the hydroxyl groups of the third polyol.

The third polyol (c) may be produced by addition-polymerizing an alkylene oxide such as propylene oxide with a polyhydric alcohol such as propylene glycol, dipropylene glycol, glycerine, trimethylolpropane, pentaerythritol, diglycerine or methylglucoside, or an alkanolamine such as ethanolamines, as an initiator, so as to provide a polyol having a hydroxyl value in the range of 450-840 mg KOH/g.

A polyoxypropylene polyol, such as dipropylene glycol or tripropylene glycol or a mixture of these may be used as the third polyol (c)

The mixture of polyols used in the invention contains the third polyol (c) in an amount of 0-25%, preferably 0-20% by weight. Namely, the third polyol (c) is used optionally to improve the strength of the resultant rigid foam or to improve the miscability of the polyols with water or other components used.

According to the invention, the mixture of polyols contains the first polyol (a) and the second polyol (b), and optionally the third polyol (c), and has a hydroxyl value in the range of 160-360 mg KOH/g, preferably in the range of 250-350 mg KOH/g. The use of the mixture of polyols having a hydroxyl value of more than 360 mg KOH/g fails to form excellent open cells, whereas the use of the mixture of polyols having a hydroxyl value of less than 160 mg KOH/g fails to form an open cell rigid foam having a sufficient strength.

According to the invention, the reaction of the mixture of polyols as set forth above with a polyisocyanate in the presence of water as a substantial blowing agent provides an open cell rigid polyurethane foam as desired. It is preferred that water is used as a sole blowing agent. The amount of water as a blowing agent is in the range of 6-12 parts by weight, preferably in the range of 7-10 parts by weight, in relation to 100 parts by weight of the mixture of polyols. When the amount of water is insufficient, there may not be obtained a low density foam, whereas when the amount of water is in excess, there may neither be obtained a correspondingly low density foam, nor excellent open cells.

Although it is desirable to carry out the foaming reaction in the presence of water as a sole blowing agent in the invention, however, if necessary, the blowing agent may be a mixture of water and a liquid having a low boiling point such as a halogenated hydrocarbon or a hydrocarbon such as pentane.

There may be used as a foam stabilizer, for example, an organopolysiloxane copolymer which is in use for the production of a soft slab or a rigid foam. The foam stabilizer used may include, for example, B-8404 or B-8017 available from Gold Schmidt, L-5410, L-5402, SZ-1127 or L-582 available from Nippon Unicar, SH-190, SH-192 or SK-193 available from Toray-Dow Corning. The foam stabilizer may be used in an amount of 0.5-3% by weight based on the total amount of the polyols used.

A catalyst may be used in the production of open cell rigid polyurethane foam of the invention. Any catalyst may be used, such as an amine, tin or lead compound. As the amine compound are preferred in general tertiary amines such as tetramethylhexadiamine (TMHDA) or pentamethyldiethylenetriamine (PMDETA). More specifically, the catalyst used includes, for example, TEDA L-33 (dipropylene glycol solution of triethylenediamine), TOYOCAT-MR (PMDETA), DT (PMDETA), NP, ET or ET-S available from Toso K. K., Kaorizer No. 1 (TMHDA), No. 3 (PMDETA) or No. 23 available from Kao K. K., Polycat 17 or 41, Dabco-33 LVC (dipropylene glycol solution of ethylenediamine), Dabco-T or Dabco-TMR available from Air Products, dibutyltin dilaurate available from Yoshitomi Seiyaku K. K., lead octylate available from Toei Kako, or Formate TK-S or formate TK-IL available from Yoshitomi Seiyaku K. K. The catalyst may be used singly or in combination.

There may be preferably used polymethylene polyphenyl polyisocyanate as a polyisocyanate in the method of the invention, in particular, such polymethylene polyphenyl polyisocyanate as has a viscosity of not more than 200 centipoises at a temperature of 25° C. Furthermore, the polyisocyanate is used at an isocyanate index of 70-120, preferably of 80-100 in relation to the polyols used. The use of too high an isocyanate index provides a foam of a high rigidity, however, the foam mainly has closed cells. On the contrary, the use of too low an isocyanate index provides a foam of an insufficient cell strength. Moreover, when such a foam is used in a panel, undesirable skin separation may take place. The use of polymethylene polyphenyl polyisocyanate having a viscosity of more than 200 centipoises at a temperature of 25° C. tends to form closed cells.

Examples of such a polymethylene polyphenyl polyisocyanate as mentioned above include, for example, Luplanate M-20S having a viscosity of 180 centipoises at a temperature of 25° C. or Luplanate M-12S having a viscosity of 120 centipoises at a temperature of 25° C. (available from Takeda Badische Urethane Kogyo K. K.), Millionate MR-200 (available from Japan Urethane), Sumidur 44V-20 or 44V-10 (available from Sumitomo Bayer), or PAPI-135 (available from Mitsubishi Chemical Dow).

Any additive such as a fire retardant, an antioxidant or a colorant may be used, if necessary. For instance, trischloropropylphosphate is preferably used as a fire retardant.

It is preferred that the open cell rigid polyurethane foam produced by the method of the invention has a density of 18-35 kg/m³ when it is produced by free foaming. When the free foam has a density of less than 18 kg/m³, it is poor in strength. It will be no use producing a rigid foam having a density of more than 35 kg/m³. When a rigid foam is produced by cast foaming or spray foaming, it is preferred that the foam has a density of 22-50 kg/m³.

As set forth above, the method of the invention provides an open cell rigid polyurethane foam by use of a specified mixture of polyols as mentioned hereinbefore together with a polyisocyanate in the presence of water as a substantial blowing agent with no need for the use of a halogenated hydrocarbon as a blowing agent.

The open cell rigid polyurethane foam according to the invention retains a good dimensional stability under the circumstances where temperatures change sharply. Accordingly, it is suitably used as a core material in a siding or a heat insulating material in a bathroom, as well as a dew formation preventing agent or other heat insulating uses.

The method of the invention is suitably applicable to the production of an open cell rigid polyurethane foam by casting or spray foaming as well as free foaming.

The invention will now be described in more detail with reference to examples and reference examples, however, the invention is not limited thereto.

The materials used in the examples and reference examples are as follows:

| | Polyol (a) |
|---|---|
| Polyol A: | Addition product of propylene oxide to glycerine, having a hydroxyl value of 42 mg KOH/g, within the scope of the invention |
| Polyol B: | Addition product of propylene oxide to glycerine, having a hydroxyl value of 70 mg KOH/g, within the scope of the invention |
| Polyol C: | Addition product of propylene oxide to glycerine, having a hydroxyl value of 160 mg KOH/g, outside the scope of the invention |
| Polyol D: | Addition product of propylene oxide and then ethylene oxide each as blocks to glycerine, having a hydroxyl value of 35 mg KOH/g, an ethylene oxide unit content of 14% by weight, and a primary hydroxyl group content of 70%, outside the scope of the invention |
| Polyol K: | Addition product of propylene oxide to glycerine, having a hydroxyl value of 56 mg KOH/g, within the scope of the invention |
| Polyol L: | Addition product of propylene oxide to glycerine, having a hydroxyl value of 34 mg KOH/g, within the scope of the invention |
| Polyol M: | Addition product of propylene oxide to a mixture of glycerine/methylglucoside (1/1 mixture, having an average functionality of 3.2), having a hydroxyl value of 57 mg KOH/g, within the scope of the invention |
| | Polyol (b) |
| Polyol E: | Addition product of propylene oxide to ethylenediamine, having a hydroxyl value of 300 mg KOH/g, within the scope of the invention |
| Polyol F: | Addition product of propylene oxide to a mixture of 2,4/2,6-tolylenediamine (80/20) and triethanolamine having an average functionality of 3.6), having a hydroxyl value of 460 mg KOH/g, within the scope of the invention |
| Polyol G: | Addition product of propylene oxide to a mixture of sorbitol and glycerine (having an average functionality of 4.5), having a hydroxyl value of 370 mg KOH/g, within the scope of the invention |
| Polyol H: | Addition product of propylene oxide (4 mols) and ethylene oxide (4.7 mols) to ethylenediamine (1 mol), havng a hydroxyl value of 450 mg KOH/g, an ethylene oxide unit content of 41% by weight, and a primary hydroxyl group content of 70%, outside the scope of the invention |
| | Polyol (c) |

-continued

| | |
|---|---|
| Polyol I: | Addition product of propylene oxide (4 mols) to ethylenediamine (1 mol), having a hydroxyl value of 770 mg KOH/g, outside the scope of the invention |
| Polyol J: | Addition product of propylene oxide to monoethanolamine, having a hydroxyl value of 500 mg KOH/g, within the scope of the invention |
| Dipropylene glycol: | having a hydroxyl value of 837 mg KOH/g, within the scope of the invention |
| Tripropylene glycol: | having a hydroxyl value of 584 mg KOH/g, within the scope of the invention |
| Diethylene glycol: | having a hydroxyl value of 1058 mg KOH/g, with all the hydroxyl groups being primary hydroxyl groups, outside the scope of the invention |

Abbreviations

| | |
|---|---|
| CT: | The time (seconds) needed for the reaction mixture to become cream after the start of mixing the material |
| GT: | The time (seconds) needed for the reaction mixture to become viscous and have a gel strength after the start of mixing the material |
| TPG: | Tripropylene glycol |
| DPG: | Dipropylene glycol |
| DEG: | Diethylene glycol |
| TCPP: | Trischloropropylphosphate |
| C-Cat: | Tetramethylhexanediamine (TMHDA, Kaorizer No. 1, Toyocat MR)/Pentamethyldiethylenetriamine (PMDETA, Kaorizer No. 3) (2/1) |
| Luplanate M-12S: | Polymethylene polyphenyl polyisocyanate, having a viscosity of 120 centipoises at 25° C., available from Takeda Badische Urethane Kogyo K.K. |
| Luplanate M-20S: | Polymethylene polyphenyl polyisocyanate, having a viscosity of 180 centipoises at 25° C., available from Takeda Badische Urethane Kogyo K.K. |

EXAMPLES 1-11

As indicated in Table 1, a polyol, a foam stabilizer, a fire retardant, water and a catalyst were mixed together to form a premix (which may be after referred to as R component hereinafter, whereas a polyisocyanate used may be often referred to as P component). Any premix thus prepared was found to be a uniform mixture.

Using 200 g of a mixture of polyols, a premix was prepared. The premix was reacted with a polyisocyanate by hand mixing foaming, to provide a free foam. The reactivity of the material used in the reaction and the density of the resultant foam are indicated in Table 1.

As examples of the production of mold foam, the premix and the polyisocyanate were cast into a mold of $300 \times 300 \times 30$ mm arranged at a temperature of 40°–45° C. to form a mold foam with no skin separation. The density and the open cell content are indicated in Table 1.

REFERENCE EXAMPLES 1-7

As indicated in Table 2, a polyol, a foam stabilizer, a fire retardant, water and a catalyst were mixed together to form a premix. By use of the premix, a free foam was produced by hand mixing foaming. The reactivity of the material in the reaction and the density of the resultant foam are indicated in Table 2.

Then, by use of the premix, a mold foam was also produced in the same manner as in the above examples, but the resultant foam was found to have a closed cell content of more than 75%. The foam was also found to be poor in dimensional stability and shrinkage was observed with each foam.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Production | | | | | | | | | | | |
| Polyol A | 40 | 40 | 30 | | | 35 | | | | | |
| Polyol B | | | | 60 | 35 | | 35 | | | | |
| Polyol K | | | | | | | | 50 | | 25 | |
| Polyol L | | | | | | | | 50 | 25 | | |
| Polyol M | | | | | | | | | | | 40 |
| Polyol E | 40 | | 50 | | | | | | 40 | 20 | |
| Polyol G | | 60 | | 30 | 50 | | 50 | | | | 40 |
| Polyol F | | | | | | 50 | | 30 | | 20 | |
| Polyol J | | | 20 | | 15 | 15 | | | | | 20 |
| TPG | 20 | | | 10 | | | | | | | |
| DPG | | | | | | | | 15 | 20 | 10 | 10 |
| (Hydroxyl value of mixture of polyols) | 253 | 239 | 263 | 211 | 285 | 320 | 335 | 333 | 221 | 258 | 270 |
| B-8017 | 1.5 | 1.5 | | 1.5 | | 1.5 | | 1.5 | 1.5 | 1.5 | 1.5 |
| B-8404 | | | 1.5 | | 2.0 | | 1.5 | | | | |
| TCPP | 20 | 20 | 20 | 20 | 20 | 20 | 20 | 20 | 20 | 20 | 20 |
| Water | 6.0 | 8.0 | 10.0 | 12.0 | 8.0 | 8.0 | 8.0 | 8.0 | 7.0 | 10.0 | 10.0 |
| C-CAT | 1.3 | 1.5 | 1.2 | 1.5 | 1.2 | 1.2 | 1.7 | 1.5 | 1.0 | 1.0 | 1.5 |
| Luplanate M-12S | 151 | 178 | 192 | | | | | 195 | | 212 | |
| Luplanate M-20S | | | | 185 | 170 | 197 | 211 | | 158 | | 193 |
| (Isocyanate index) | 100 | 100 | 90 | 80 | 90 | 100 | 105 | 100 | 100 | 100 | 90 |
| Reactivity | | | | | | | | | | | |
| CT (seconds) | 12 | 12 | 10 | 12 | 9 | 8 | 12 | 14 | 12 | 10 | 15 |
| GT (seconds) | 48 | 65 | 42 | 68 | 52 | 42 | 68 | 47 | 64 | 50 | 72 |
| Free foam density (kg/m$^3$) | 26.7 | 24.5 | 21.4 | 18.5 | 23.8 | 24.5 | 24.0 | 22.8 | 24.6 | 20.8 | 21.5 |
| Properties | | | | | | | | | | | |
| Overall density (kg/m$^3$) | 38.5 | 36.7 | 32.1 | 28.6 | 38.0 | 37.6 | 39.0 | 34.5 | 38.4 | 34.4 | 35.4 |
| Closed cell content (%) | 5 | 8 | 10 | 15 | 5 | 10 | 5 | 5 | 4 | 10 | 5 |
| Dimensional stability | Good | Good | Good | Good | Good | Good | Good | Good | Good | Good | Good |

TABLE 2

| | Reference Examples | | | | | | |
|---|---|---|---|---|---|---|---|
| | 1 | 2 | 3 | 4 | 5 | 6 | 7 |
| Production | | | | | | | |
| Polyol A | | | 50 | 40 | 40 | 20 | 30 |
| Polyol C | 40 | | | | | | |
| Polyol D | | 40 | | | | | |
| Polyol G | 50 | 55 | 30 | | 50 | 80 | 40 |
| Polyol H | | | | 50 | | | |
| Polyol I | | | 20 | | | | |
| Polyol J | 10 | | | 10 | | | 30 |
| DEG | | 5 | | | 10 | | |
| (Hydroxyl value of Mixture of polyols) | 299 | 270 | 286 | 292 | 307 | 304 | 311 |
| B-8017 | 1.5 | 1.5 | 1.5 | 1.5 | 1.5 | 1.5 | 1.5 |
| TCPP | 20 | 20 | 20 | 20 | 20 | 20 | 20 |
| Water | 8.0 | 8.0 | 10.0 | 10.0 | 10.0 | 8.0 | 12.0 |
| C-CAT | 1.5 | 1.5 | 1.2 | 0.8 | 1.5 | 1.5 | 1.2 |
| Luplanate M-12S | | | 197 | 198 | | 193 | 229 |
| Luplanate M-20S | 192 | 185 | | | 224 | | |
| (Isocyanate index) | 100 | 100 | 90 | 90 | 100 | 100 | 90 |
| Reactivity | | | | | | | |
| CT (seconds) | 12 | 10 | 8 | 7 | 12 | 12 | 10 |
| GT (seconds) | 58 | 50 | 43 | 44 | 58 | 65 | 47 |
| Free foam density (kg/m³) | 23.8 | 23.0 | 21.0 | 21.4 | 22.0 | 23.4 | 19.0 |
| Properties | | | | | | | |
| Overall density (kg/m³) | 38.0 | 37.5 | 33.4 | 34.0 | 34.2 | 37.8 | 29.5 |
| Closed cell content (%) | 75 | 85 | 85 | 84 | 75 | 85 | 83 |
| Dimensional stability | * | * | * | * | * | * | * |

Notes: *The foam shrank.

EXAMPLE 12

An R component and a P component each of the following composition were prepared.

| R Component | |
|---|---|
| Polyol B: | 50 parts by weight |
| Polyol F: | 35 |
| Polyol J: | 15 |
| (The mixture of polyols had a hydroxyl value of 271 mg KOH/g) | |
| B-8017: | 1.5 |
| TCPP: | 20 |
| C-Cat: | 1.5 |
| Water: | 8.0 |
| P Component | |
| Luplanate M-12S: | 185 |
| (Isocyanate index of 100) | |

The above components were reacted by use of a high pressure foaming machine (PU-50, Polyurethane Engineering) at temperature of 20° C. with respect to both components and a discharge pressure of R/P of 150/130 kg/cm²G.

The CT time was 8 seconds, and the GT time was 42 secinds. The free foam had a density of 22.8 kg/m³.

A mold foam was produced by casting the material into a mold of 500×500×45 mm at a temperature of 45° C., and after six minutes, the resultant mold foam was released from the mold. The packing rate was arranged at 110% or 116%. The properties of the foam are indicated in Table 3. The initial adhesive strength to an iron plate is also shown in Table 3. In both cases, foam failure took place.

TABLE 3

| | Packing Rate (%) | |
|---|---|---|
| | 110 | 116 |
| Overall density (kg/m³) | 32.8 | 35.6 |
| Initial adhesive strength (kg/cm²) (after 10 minutes) | 0.42 | 0.48 |
| Core density (kg/m³) | 30.4 | 33.8 |
| Thermal conductivity (kcal/mHr °C.) | 0.0292 | 0.0292 |
| Compression strength (kg/cm²) | 0.37 | 0.38 |
| Dimensional change (%) | | |
| (80° C. × 22 hours) | 0 | 0 |
| (−30° C. × 22 hours) | 0 | 0 |

EXAMPLE 13

An R component and a P component each of the following composition were prepared.

| R Component (Premix) | |
|---|---|
| Polyol A: | 30 parts by weight |
| Polyol E: | 50 |
| Polyol J: | 20 |
| (The mixture of polyols had a hydroxyl value of 263 mg KOH/g) | |
| SH-190: | 2.0 |
| TEDA L-33: | 4.0 |
| TCPP: | 24 |
| Water: | 8.0 |
| Lead octylate: | 1.0 |
| Dibutyltin dilaurate: | 1.0 |
| P Component | |
| Luplanate M-20S: | |
| (Used so that the R/P volume ratio was 100/100) | |
| (Isocyanate index of 88) | |

The above materials were reacted by use of a spray foaming machine (FF-50, Gasmer) to form on a veneer. The foam was found to have excellent open cells.

The CT time was 2 seconds, and the GT time was 6 seconds. The free foam had a density of 22.5 kg/m³ and a closed cell content of less than 1%.

The properties of the spray foam are indicated in Table 4.

TABLE 4

|  | Spray Foam |
|---|---|
| Density (kg/m$^3$) | 29.5 |
| Thermal conductivity (kcal/mHr °C.) | 0.0292 |
| Compresssion strength (kg/cm$^2$) | 0.92 |
| Dimensional change (%) (80° C. × 22 hours) | 0 |

As illustrated in Examples 12 and 13, the method of the invention is applicable either to mold foaming or spray foaming to provide a rigid foam having excellent open cells.

What is claimed is:

1. A method of producing an open cell rigid polyurethane foam which comprises reacting a mixture of polyols having a hydroxyl value of 160-360 mg KOH/g with a polyisocyanate in the presence of water as a blowing agent in an amount of 6-12 parts by weight in relation to 100 parts by weight of the mixture of polyols at an isocyanate index of 70-120, the mixture of polyols comprising:
    (a) 30-60% by weight of a first polyoxyalkylene polyol having a functionality of 2-3.5, a hydroxyl value of 28-90 mg KOH/g, a polyoxyethylene unit content of not more than 5% by weight, and a primary hydroxyl group content of not more than 15% based on the total of the hydroxyl groups of the first polyoxyalkylene polyol;
    (b) 30-60% by weight of a second polyoxyalkylene polyol having a functionality of 3-6, a hydroxyl value of 150-500 mg KOH/g, and a primary hydroxyl group content of not more than 5% based on the total of the hydroxyl groups of the second polyoxyalkylene polyol; and
    (c) 0-25% by weight of a third polyol having a functionality of 2-3, a hydroxyl value of 450-840 mg KOH/g, and a primary hydroxyl group content of not more than 5% based on the total of the hydroxyl groups of the third polyol.

2. The method as claimed in claim 1 wherein the polyol (a) is an addition product of propylene oxide to a polyhydric alcohol as an initiator.

3. The method as claimed in claim 1 wherein the polyol (b) is an addition product of propylene oxide to an aliphatic amine or an aromatic amine as an initiator.

4. The method as claimed in claim 1 wherein the polyol (C) is dipropylene glycol or tripropylene glycol.

5. The method as claimed in claim 1 wherein each of the polyols (a), (b) and (c) is a polyoxypropylene polyol.

6. The method as claimed in claim 1 wherein the polyisocyanate is polymethylene polyphenyl polyisocyanate having a viscosity of not more than 200 centipoises at the temperature of 25° C.

7. The method as claimed in claim 1 wherein the mixture of polyols has a hydroxyl value of 250-350 mg KOH/g.

8. The method as claimed in claim 1 wherein the mixture of polyols is reacted with a polyisocyanate at an isocyanate index of 80-100.

9. The method as claimed in claim 1 wherein water is used as a blowing agent in an amount of 7-10 parts by weight in relation to 100 parts by weight of the mixture of polyols.

10. The method as claimed in claim 1 wherein the polyol (a) is an addition product of propylene oxide to glycerine.

11. The method as claimed in claim 1 wherein the polyol (a) is an addition product of propylene oxide to a mixture of glycerine and methylglucoside.

12. The method as claimed in claim 1 wherein the polyol (b) is an addition product of propylene oxide to at least one of an ethylene(poly)amine, an aliphatic amine and an aromatic amine.

13. The method as claimed in claim 1 wherein the polyol (b) is an addition product of propylene oxide to a mixture of sorbitol and glycerine.

14. The method as claimed in claim 1 wherein the mixture of polyols contains the polyol (a) in an amount of 35-55% by weight.

15. The method as claimed in claim 1 wherein the mixture of polyols contains the polyol (b) in an amount of 40-55% by weight.

16. The method as claimed in claim 1 wherein the mixture of polyols contains the polyol (c) in an amount of 0-20% by weight.

17. The method as claimed in claim 1 wherein when a free foam is produced, the foam has a density of 18-35 kg/m$^3$.

18. The method as claimed in claim 1 wherein when a mold foam or spray foam is produced, the foam has a density of 22-50 kg/m$^3$.

* * * * *